United States Patent
Sakabe

(10) Patent No.: US 10,256,513 B2
(45) Date of Patent: Apr. 9, 2019

(54) BATTERY SYSTEM

(71) Applicant: HITACHI, LTD., Tokyo (JP)

(72) Inventor: Kei Sakabe, Tokyo (JP)

(73) Assignee: HITACHI, LTD., Tokyo (JP)

( * ) Notice: Subject to any disclaimer, the term of this patent is extended or adjusted under 35 U.S.C. 154(b) by 106 days.

(21) Appl. No.: 15/313,988

(22) PCT Filed: May 26, 2014

(86) PCT No.: PCT/JP2014/063768
§ 371 (c)(1),
(2) Date: Nov. 25, 2016

(87) PCT Pub. No.: WO2015/181866
PCT Pub. Date: Dec. 3, 2015

(65) Prior Publication Data
US 2017/0149101 A1 May 25, 2017

(51) Int. Cl.
*H01M 10/48* (2006.01)
*H02J 7/00* (2006.01)

(52) U.S. Cl.
CPC .......... *H01M 10/48* (2013.01); *H02J 7/0029* (2013.01); *H02J 7/0047* (2013.01); *H02J 2007/005* (2013.01)

(58) Field of Classification Search
CPC ..................... H01M 10/48; H01M 10/482
See application file for complete search history.

(56) References Cited

U.S. PATENT DOCUMENTS 6,074,775 A * 6/2000 Gartstein .............. H01M 2/12
429/53
2009/0206679 A1* 8/2009 King ..................... B60L 3/0046
307/125

(Continued)

FOREIGN PATENT DOCUMENTS

JP 2011-151717 A 8/2011
JP 2011-250683 A 12/2011

(Continued)

OTHER PUBLICATIONS

The Extended European Search Report dated Dec. 8, 2017 for the European Application No. 14892920.1.

Primary Examiner — Abdullah Riyami
Assistant Examiner — Nader Alhawamdeh
(74) Attorney, Agent, or Firm — Volpe and Koenig, P.C.

(57) ABSTRACT

Provided is a battery system having improved safety and reliability. The battery system includes a battery module including a unit cell and a cell controller performing control of the unit cell and a battery controller performing control of the battery module; the cell controller includes an abnormality diagnosis unit which diagnoses the presence or absence of abnormality of the unit cell, a state detection unit which calculates any one or more of voltage, current, temperature, SOC, SOH, and allowable charge/discharge current of the unit cell, a power line communication unit which performs wire communication, and a wireless communication unit which performs wireless communication, the information diagnosed by the abnormality diagnosis unit is output through the power line communication unit to the battery controller; and the information calculated by the state detection unit is output through the wireless communication unit to the battery controller.

9 Claims, 3 Drawing Sheets

(56) References Cited

U.S. PATENT DOCUMENTS

2011/0313613 A1* 12/2011 Kawahara ........... H01M 10/441
701/34.4
2011/0316520 A1* 12/2011 Kawahara ............. B60L 3/0046
323/351

FOREIGN PATENT DOCUMENTS

| JP | 2011-252305 A | 12/2011 | |
|----|----|----|----|
| JP | 2012-044353 A | 3/2012 | |
| JP | WO 2013011692 A1 * | 1/2013 | .......... H01M 10/482 |
| WO | 2013/011692 A1 | 1/2013 | |
| WO | 2013/076803 A1 | 5/2013 | |

* cited by examiner

BATTERY SYSTEM

TECHNICAL FIELD

The present invention relates to a battery system and, more particularly, a communication method for battery information and abnormality information.

BACKGROUND ART

In recent years, battery systems equipped with a large number of cells such as a power storage device for a vehicle, a power storage device for stabilization associated with a system, a power storage device for emergency have attracted attention. In order to achieve the performance of these systems, it is necessary to calculate parameters such as a charging rate (SOC) or a deterioration rate (SOH) of each cell and a maximum rechargeable current (allowable charge/discharge current) and to appropriately equalize the charging rates of the cells. In order to achieve the above purpose, a circuit (cell controller) for cell voltage measurement is attached to each cell, and a battery controller equipped with a central processing unit (CPU) performs the above calculation or operations on the basis of information transmitted from the cell controllers. However, there is a problem in that, as the number of cells included in the battery system is increased, the number of communication lines connecting the cell controllers and a battery controller is increased, and a production cost required for connection of the lines is also increased.

In order to solve the problem, by using power line communication ("power line communication circuit of modifying voltage detection signals detected by a voltage detection circuit into power line communication signals and superposing the modified power line communication signals between positive and negative output terminals to output the superposed, modified power line communication signal") disclosed in, for example, PTL 1, communication between the cell controllers and the battery controller can be implemented without separately preparing a communication line.

CITATION LIST

Patent Literature

PTL 1: JP 2011-250683 A

SUMMARY OF INVENTION

Technical Problem

In the invention disclosed in PTL 1, instead of connecting the cell controller and the battery controller by a communication line, a power line communication is used, so that there is no need to separately prepare a communication line. However, since internal impedance of the cell is small, there is a problem in that it is difficult to increase the communication speed. For this reason, if detailed information on a large number of the cells is to be transmitted, the control period is increased.

On the other hand, in wireless communication as a promising technique which does not require a communication line, high-speed communication can be obtained, but a communication blackout rate is generally higher than that of wire communication, and communication becomes unreliable. For this reason, it is difficult to transmit and receive information indicating that a system is to be immediately stopped such as over-voltage abnormality of the cell.

Solution to Problem

The present invention includes a plurality of means for solving the problem, and as an example thereof, a battery system according to the present invention includes: a battery module including a unit cell and a cell controller performing control of the unit cell; and a battery controller performing control of the battery module, wherein the cell controller includes an abnormality diagnosis unit which diagnoses the presence or absence of abnormality of the unit cell, a state detection unit which calculates any one or more of voltage, current, temperature, SOC, SOH, and allowable charge/discharge current of the unit cell, a power line communication unit which performs wire communication, and a wireless communication unit which performs wireless communication, wherein information diagnosed by the abnormality diagnosis unit is output through the Power line communication unit to the battery controller, and information calculated by the state detection unit is output through the wireless communication unit to the battery controller.

Advantageous Effects of Invention

According to the means disclosed in the present invention, it is possible to provide a battery system having improved safety and reliability.

DESCRIPTION OF EMBODIMENTS

Figure 1:
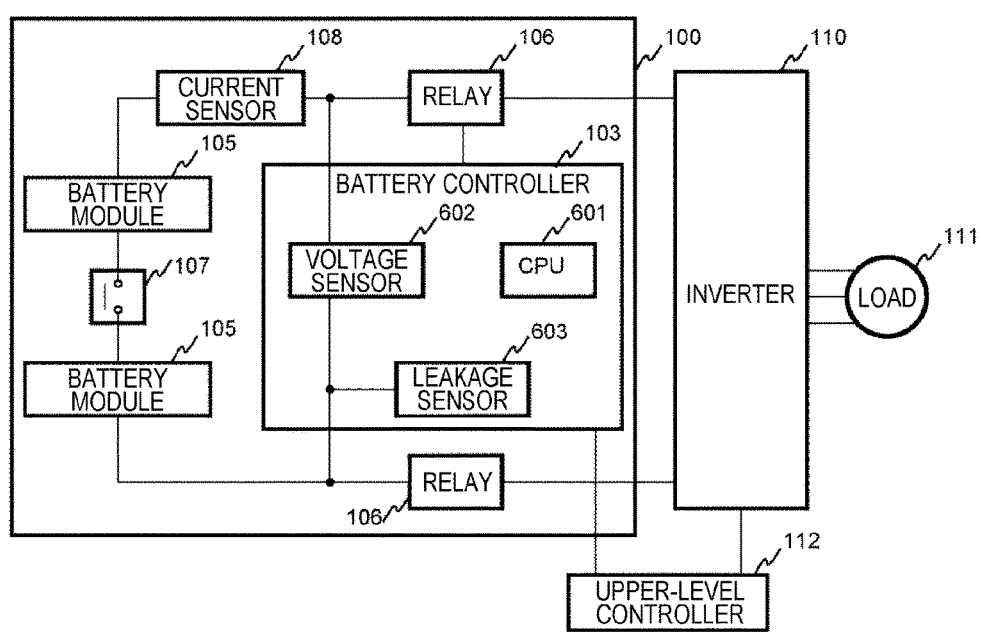
FIG. 1 is a diagram illustrating an example of a configuration of connection between a battery system and a load according to the present invention.

Hereinafter, a first embodiment will be described with reference to FIGS. 1 and 2.

First Embodiment

First, an example of a battery system 100 will be described. FIG. 1 illustrates an example of a battery system which supplies battery power to a load. Since an output voltage of the battery system 100 is a DC voltage which is changed according to a remaining capacity, an output current, or the like of a battery, in some case, it may not be appropriate to directly supply a power to a load 111. For this reason, an inverter 110 controlled by an upper-level controller 112 converts the output voltage of the battery system 100 into a three-phase AC voltage and supplies the three-phase AC voltage to the load 111. In the case where of supplying a DC voltage, another multi-phase AC voltage, or a single-phase AC voltage to the load, the same configuration is employed.

In addition, in the case where the load 111 outputs a power, the inverter 110 is configured with a bi-directional inverter, so that the power output by the load 111 can be stored in the battery system 100.

In addition, by connecting the charging system to the battery system 100 in parallel to the inverter 110, if necessary, charging of the battery system 100 may be available.

The battery system 100 transmits information on a cell state such as a charging rate (SOC) or a deterioration rate (SOH) of the cell, a maximum flow-able charge current/discharge current (allowable charge/discharge current), cell temperature, or the presence or absence of abnormality of the battery useful for control of the inverter 110 or the load 111 to the upper-level controller 112.

The upper-level controller 112 performs energy management, abnormality detection, or the like on the basis of the information. In addition, in the case where it is determined that the battery system 100 needs to be disconnected from inverter 110 or the load 111, the upper-level controller 112 transmits disconnection instruction to the battery system 100.

The battery system 100 is configured to include two or more battery modules 105 configured with one or more unit cells, a battery controller 103 which monitors, estimates, and controls the state of the battery system 100 or each battery module 105, a relay 106 which connects and disconnects the output of the battery system 100, a current sensor 108 which measures current flowing the cells, a voltage sensor 602 which measures a cell voltage, a leakage sensor 603 which measures insulation resistance between the battery system 100 and, for example, the earth, and a breaker 107 which is provided according to the output voltage of the battery system.

The battery module 105 includes one or more unit cells, measures an internal temperature of the module or the voltage of each cell, and if necessary, performs charging and discharging in unit of a unit cell. Therefore, voltage monitoring or voltage adjustment can be performed in unit of a unit cell, and temperature information required for estimating the state of the cell of which characteristics are changed according to the temperature can be measured. The details thereof will be described later.

In the battery module 105, the current sensor 108 and the relay 106 are directly connected to the battery module 105. Therefore, the current required for monitoring and estimating the state of the battery module 105 can be measured, and the output of the battery system 100 can connected or disconnected on the basis of an instruction of the upper-level controller. In the case where the battery module is a high voltage battery module of, for example, 100 V or more, a breaker 107 for manually blocking power input and output with respect to the battery system 100 may be added. By forcibly blocking the power input and output by using the breaker 107, at the time of assembling or disassembling the battery system 100 or at the time of treating an accident of an apparatus equipped with the battery system 100, it is possible to prevent the occurrence of an electric shock accident or a short-circuit accident.

In addition, in the case where a plurality of the battery modules 105 are connected in parallel, the relay 106, the breaker 107, and the current sensor 108 may be provided to each column, and the relay 106, the breaker 107, and the current sensor 108 may be provided to only the output portion of the battery system 100. In addition, the relay 106, the breaker 107, and the current sensor 108 may be provided to both of each column and the output portion of the battery system 100.

The relay 106 may be configured with a single relay or may be configured with a set of a main relay, a pre-charge relay, and a resistor. In the latter configuration, the resistor is arranged to the pre-charge relay in series, and the resistor and the pre-charge relay are connected to the main relay in parallel. In the case where the relay 106 is connected, first, the pre-charge relay is connected. Since the current flowing in the pre-charge relay is restricted by the resistor connected in series thereto, an inrush current which may be generated in the former configuration can be restricted. Next, after the current flowing in the pre-charge relay is sufficiently reduced, the main relay is connected. The timing of connecting the main relay may be set by using the current flowing in the pre-charge relay as a reference, may be set by using the voltage across the resistor or the voltage between the terminals the main relay as a reference, or may be set by using the time elapsing from the connection of the pre-charge relay as a reference.

The voltage sensor 602 is connected in parallel to one battery module or a plurality of the battery modules 105 or each one column of the battery modules 105 to measure a voltage value required for monitoring and estimating the state of the battery modules 105. In addition, the leakage sensor 603 connected to the battery module 105 has a function of detecting the state that current leakage is likely to occur, that is, the state that the insulation resistance is lowered to prevent the occurrence of accidents before the current leakage occurs.

The values measured by the battery module 105, the current sensor 108, the voltage sensor 602, and the leakage sensor 603 are transmitted to the battery controller 103, and the battery controller 103 performs monitoring, estimation, and control of the cell state on the basis of the values. Herein, the control denotes, for example, control of charging and discharging of the unit cells for equalizing the voltages of the unit cells, control of the power of each sensor, addressing of the sensors, control of the relay 106 connected to the battery controller 103, and the like. The calculation required for the monitoring, estimation, and control of the cell state is executed by a CPU 601. In addition, a fan for cooling the system may be included in the battery system 100, and the control may be performed by battery controller 103. In this manner, the battery system 100 also performs even the cooling, so that it is possible to reduce the amount of communication with an upper-level controller.

The battery controller 103 may include the voltage sensor 602 or a leakage sensor 603. By doing so, in comparison with the case where separate sensors are prepared, the number of safety belts can be reduced, and labors for sensor installation can be reduced. However, the sensors are included, and thus, the size (maximum output voltage, current, and the like) of the battery system 100 which the battery controller 103 can cope with are limited, so that a degree of freedom may be given by configuring the voltage sensor 602 or the leakage sensor 603 as a component separated from the battery controller 103.

Next, the battery module 105, the battery controller 103, and the relay 106 will be described in detail with reference to FIG. 2.

The battery module 105 is configured to include one or more unit cells 101 connected in series and parallel and a cell controller 102 which is connected through a voltage detection line 113 to the unit cells 101 and monitors and controls the unit cells 101.

The unit cell 101 is a primary battery, a secondary battery, a capacitor, or an electricity generating element such as a lithium ion battery, a nickel hydride battery, an electric double layer capacitor, an air battery, a fuel cell, or a lead-acid battery. The unit cell 101 is a source of supplying a power which the load 111 requires. In addition, in the case where a secondary battery or a capacitor is used for the unit cell 101, the unit cell may absorbs a power output from the load 111 to store the power. In this case, the stored power is used for an output power again, so that a highly-efficient system without a waste can be configured.

The cell controller 102 is configured to include a measurement unit 201, an abnormality diagnosis unit 202, a state detection unit 203, a power line communication unit 204, and a wireless communication unit 205 and is connected to one unit cell or a plurality of the unit cells 101.

The measurement unit 201 measures a voltage, temperature, and the like of the unit cells 101. In addition, if necessary, the unit cells 101 are individually charged and discharged. The measurement of voltage or temperature may be performed on each unit cell 101 or may be performed on a plurality of the unit cells 101. In addition, instead of the temperature of the unit cell, an internal temperature of the battery module 105 may also be measured. Whether or not it is necessary to measure the voltage of each unit cell 101 depends on the type of the unit cell 101. For example, in the case of a lithium ion battery, it is preferable that the voltage of each unit cell 101 is measured. In addition, in the case of a nickel hydride battery or a primary battery, the measurement of voltage of a plurality of the unit cells 101 is sufficient.

The voltage or temperature information of the unit cell 101 measured by the measurement unit 201 is transmitted to the abnormality diagnosis unit 202 and the state detection unit 203.

The abnormality diagnosis unit 202 diagnoses whether or not the voltage or temperature of the unit cell 101 measured by the measurement unit 201 is a value implying cell abnormality such as over-charge, over-discharge, or over-current, and in the case of a value implying the abnormality, the abnormality diagnosis unit transmits the state of abnormality to the power line communication unit 204. The result of the diagnosis may indicate only the abnormality. In this case, circuitry or program is simplified, so that a highly-reliable system is achieved. In addition, information indicating what type of abnormality occurs may be applied. In this case, the treatment can be taken according to the type of abnormality, so that preventing of stopping an unnecessary system or minimizing of a function of stopping the unnecessary system can be performed. In addition, a degree of the abnormality: minor, serious, or fatal may be applied. Even in this case, preventing of stopping the unnecessary system or minimizing of a function of stopping the unnecessary system can be performed. Furthermore, by applying information of minor abnormality which causes the system to be stopped, it is possible to configure a highly-reliable system that can be repaired before serious abnormality which is involved with the stopping of the system occurs.

The state detection unit 203 calculates the voltage, current, temperature, Sac, SOH, and allowable charge/discharge current of the unit cell 101 on the basis of the voltage or temperature of the unit cell 101 measured by the measurement unit 201 and transmits the result to the wireless communication unit 205. If necessary, the characteristics of the cell required for state detection are stored in the cell controller 102 in advance, so that highly-accurate calculation of the voltage, current, temperature, SOC, SOH, and allowable charge/discharge current can be implemented. In this manner, the characteristics of the unit cell 101 are stored in the cell controller, and thus, there is no need that the battery controller 103 knows the characteristics of the unit cell 101, so that a degree of freedom is improved. In addition, on the contrary, the state detection unit 203 may receive the result of measurement from the measurement unit 201 without calculation and transmit the received result to the wireless communication unit 205 without change. By doing so, there is no need that a CPU is provided to each cell controller 102, so that it is possible to reduce component cost and failure rate.

As information transmitted to the wireless communication unit 205 by the state detection unit 203, there are, for example, a voltage or temperature of each unit cell 101, internal temperature of the battery module 105, temperature of absorbed air, temperature of vented temperature, a result of estimation of SOC, a result of estimation of SOH, a model number of the unit cell 101, a data of manufacture of the unit cell 101, a serial number of the unit cell 101, the number of times of reaching an over-voltage, the number of times of reaching over-discharge, an average voltage of the unit cell 101, the number of times of charge and discharge of the unit cell 101, internal resistance of the unit cell 101, full-charge capacity of the unit cell 101, a model number of the cell controller 102, a data of manufacture of the cell controller 102, a serial number of the cell controller 102, an identification number of the cell controller 102, internal temperature of the cell controller 102, the number of times of power supply of the cell controller 102, an activation time of the cell controller 102, and the like. In addition, the aforementioned information is an example of the information which the state detection unit 203 transmits through the wireless communication unit 205 to the battery controller 103. Actually, a portion of the aforementioned information may be used, or another information may be added thereto.

The power line communication unit 204 converts the abnormality information received from the abnormality diagnosis unit 202 to an AC signal, outputs the AC signal to the voltage detection line 113, and outputs from the power line 104 to each component, for example, the battery controller 103 of the battery system. By modulating the AC signal, the information on the type or degree of the abnormality may be added. As an example of the associated modification, frequency modulation is applied according to the type of the abnormality, and amplitude modulation is applied according to the degree of the abnormality. For example, if fatal abnormality is set to a high voltage and if serious abnormality is set to a low frequency, noise resistance or crosstalk resistance of the power line communication can be improved. In addition, since the leakage sensor 603 output an AC signal at the time of detection of the insulation resistance, it is preferable that the frequency and a frequency for power line communication do not overlap with each other.

The abnormality information is information which has a small information amount but needs to reliably reach to the receiving side. Since the power line communication unit 204 has a low-speed but implements reliable communication, if the power line communication unit 204 is specialized in transmission of the abnormality information, reliable communication can be implemented.

The wireless communication unit 205 converts the information received from the state detection unit 203 into a wireless signal and outputs the wireless signal to each component, for example, the battery controller 103 of the battery system. In addition, in the case where the wireless signal from the battery controller 103 is received and the instruction for the cell controller 102 is included, individual charging or discharging of the unit cells 101, charge of measurement settings of the measurement unit 201, resetting of the cell controller 102, or the like is performed according to the content thereof. Although the information transmitted and received through the wireless communication is used for the calculation of the voltage, current, temperature, SOC, SOH, allowable charge/discharge current, and the like of the unit cell, since these values are not rapidly changed, even in the case where temporary data deficiency occurs, it is possible to cope with the deficiency by using the result of the previous calculation. Therefore, such data that have a large data amount with unnecessary reliability are transmitted and received through the wireless communication, so that a high speed of control period or the like is implemented.

The battery controller 103 is configured to include a wireless communication unit 402 which transmits and receives information with respect to the cell controller 102 through the wireless communication, a power line communication unit 403 which transmits and receives the abnormality information from the cell controller 102, and a battery control unit 401 which performs estimation or calculation of the cell state and outputs the instruction to the cell controller 102 through the wireless communication unit 402 if necessary on the basis of the information from the wireless communication unit 402 and the power line communication unit 403.

If necessary, the battery control unit 401 performs calculation of the voltage, current, temperature, SOC, SOH, and allowable charge/discharge current on the basis of the cell state received through the wireless communication unit 402 from the cell controller 102 and outputs the result of the calculation to the upper-level controller 112. In addition, the presence or absence of abnormality or a degree of the abnormality is determined on the basis of the result of the calculation or the abnormality information received through the power line communication unit 403 from the cell controller 102, and in the case where the fatal abnormality is detected, the relay 106 is released. In this manner, at the time of the fatal abnormality detection, by releasing the relay 106 independently of the upper-level controller 112, even at the time of communication disconnection with respect to the upper-level controller 112 or at the time of the abnormality of the upper-level controller 112, the system can be maintained to be in the safe state.

In the case where a variation in voltage or SOC of each unit cell 101 is detected, charge/discharge instruction for removing the variation is transmitted through the wireless communication unit 402 to the cell controller 102. Therefore, it is possible to prevent over-charge or over-discharge of the unit cell 101 or reduction of a chargeable/dischargeable range caused by the variation.

As described heretofore, the feature of the present invention is that the battery system 100 is configured to perform the result of the state detection of the battery module 105 through wireless communication and to perform the result of the abnormality diagnosis of the battery module 105 through the power line communication. In the wireless communication, the communication speed is high, but communication error easily occurs in comparison with the wire communication, and thus, the reliability is low. In the power line communication, because of wire communication, the communication error not easily occurs, but the communication speed is low.

However, in the embodiment, the transmission of the result of the state detection requiring high-speed communication is performed through the wireless communication, and the transmission of the abnormality information requiring reliable transmission without consideration of a high speed is performed through the power line communication, so that, in comparison with the case of using the only one of the wireless communication and the power line communication as the transmission means, it is possible to achieve high-speed communication and highly-reliable communication.

In addition, signal lines dedicated for both of the wireless communication and the power line communication are unnecessary, and the number of safety belts required for the battery system 100 can be reduced.

Figure 2:
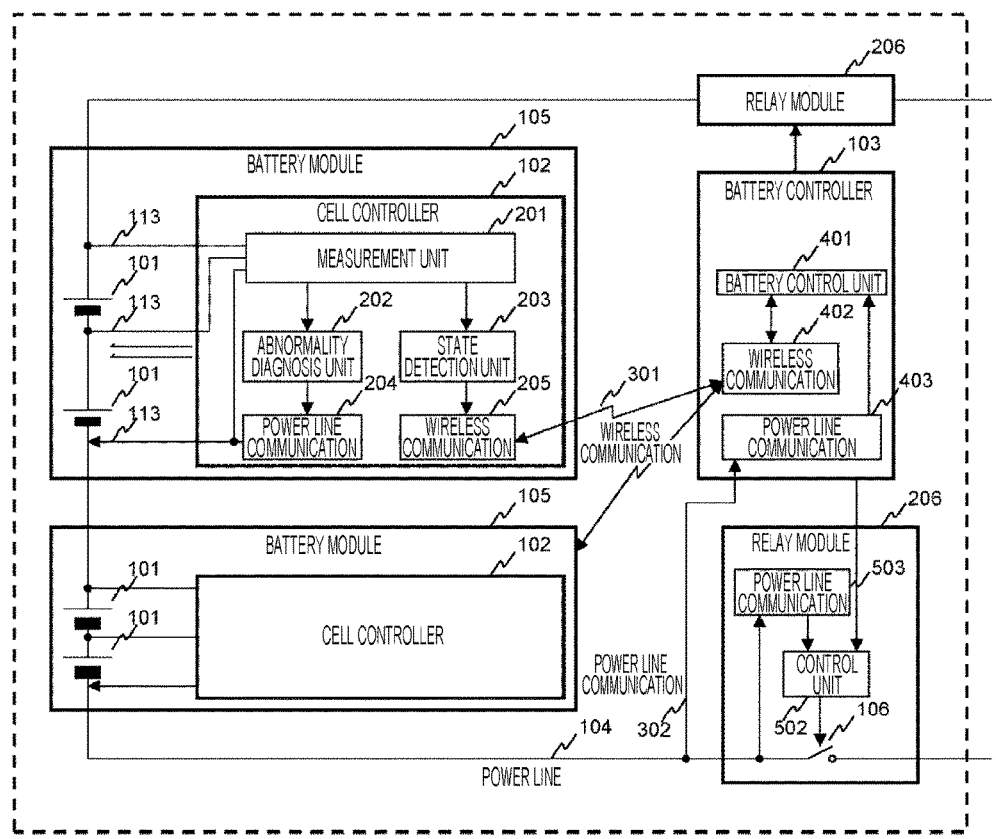
FIG. 2 is a diagram illustrating an example of a configuration of a battery system according to a first embodiment.

In addition, as illustrated in FIG. 2, in some cases, a relay module 206 where a power line communication unit 503 and a control unit 502 are added to the relay 106 may be employed.

The power line communication unit 503 is configured to receive abnormality information from the battery module 105 and to transmit the abnormality information to the control unit 502.

On the other hand, the control unit 502 performs connection and disconnection of the relay 106 on the basis of the information and the connection/disconnection instruction received from the battery controller 103. The control unit 502 is operated so that the determination of the relay disconnection based on the abnormality information from the battery module 105 is prioritized in comparison with the relay connection instruction from the battery controller 103. Therefore, even in the case where fatal abnormality occurs simultaneously in the battery module 105 and the battery controller 103 and the relay disconnection instruction is not transmitted from the battery controller 103 to the relay module 206, the relay module 206 can disconnect the relay on the basis of the abnormality information transmitted from the battery module 105 according to independent determination and maintain the safety of the battery system 100.

Heretofore, in the first embodiment, the transmission of detailed information on a plurality of cells requiring high speed communication is enabled by using the wireless communication, and the transmission of the abnormality information is enabled by power line communication as wire communication simultaneously to implement the communication requiring reliability, so that it is possible to provide a battery system of which safety and reliability are improved.

In addition, since there is no need to provide a separate communication line connecting the cell controller and the battery controller, a simple battery system can be configured, so that cost is reduced.

Second Embodiment

Subsequently, a second embodiment will be described. The embodiment is different from the first embodiment in that the result of the abnormality diagnosis is configured to be transmitted through the wireless communication as well as the power line communication. In addition, the same configurations as those described in the first embodiment are denoted by the same reference numerals as those used in the first embodiment.

Figure 3:
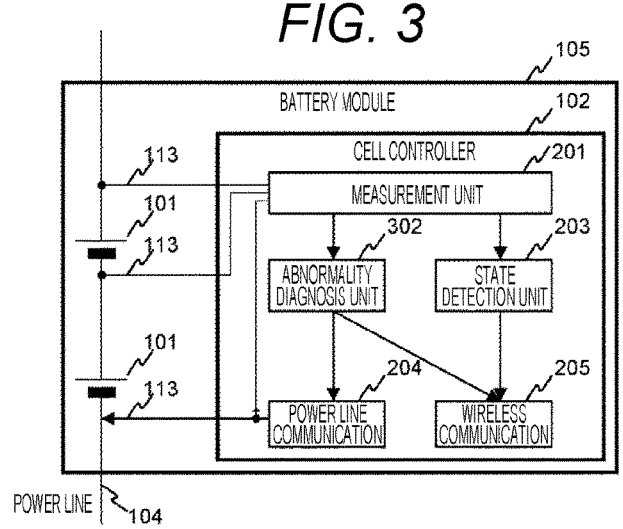
FIG. 3 is a diagram illustrating an example of a configuration of a battery module of a battery system according to a second embodiment.

FIG. 3 is an example of a configuration of a battery module 105 according to the second embodiment. In the battery module 105 of FIG. 2, the portions having the same functions as those of the configuration denoted by the same reference numerals illustrated in FIG. 2 described above are omitted in description.

An abnormality diagnosis unit 302 is configured to transmit the result of diagnosis to both of a power line communication unit 204 and a wireless communication unit 205. Therefore, the transmission amount during the wireless communication is increased, even in the case where abnormality such as disconnection occurs in the power line communication unit 204, a voltage detection line 113, unit cells 101, or a power line 104 and the power line communication becomes disable, the abnormality information can be directly transmitted to a battery controller 103 by the wireless communication unit 205, so that the reliability is improved.

Third Embodiment

Subsequently, a third embodiment will be described. The embodiment is different from the first embodiment in that a small-sized battery system 300 using only one battery module 105 including one unit cell 101 or about fourteen unit cells 101 is provided. In addition, the same configurations as those described in the first embodiment are denoted by the same reference numerals as those used in the first embodiment.

Figure 4:
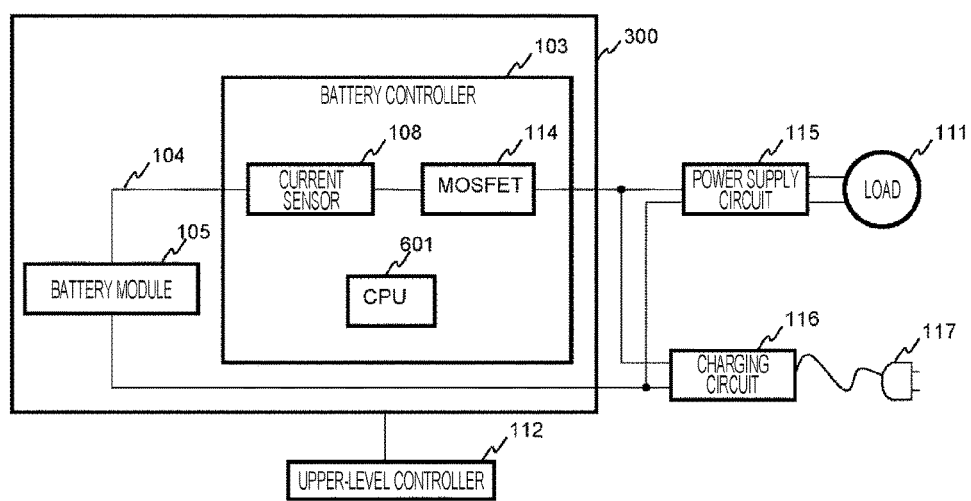
FIG. 4 is a diagram illustrating an example of a configuration of connection between a battery system and a load according to a third embodiment.

FIG. 4 is a diagram illustrating an example of a configuration of a battery system, a load, and a charging circuit according to the third embodiment. In the battery system. 100 of FIG. 1, the portions having the same functions as those of the configuration denoted by the same reference numerals illustrated in FIG. 2 described above are omitted in description.

A battery system 300 according to the embodiment includes a battery controller 103 and a battery module 105. The battery module 105 includes one unit cell 101 or about fourteen unit cells 101. On the other hand, the battery controller 103 is configured to include a current sensor 108, a MOSFET 114, and a CPU 601 and is connected to the power line 104 which the battery module 105 and the load 111 are connected to. The current sensor 108 is configured as a shunt resistor type which obtains a current value by measuring a voltage generated when a current flows in a shunt resistor of which resistance value is adjusted at a good accuracy. In addition, in a structure according to the present invention, the relay 106 and the battery controller according to the first embodiment are integrated. As a connection/disconnection element replacing the relay 106, the MOSFET 114 or a semiconductor switch similar to the MOSFET is used. An analog-digital converter, a semiconductor switch, and the CPU 601 required for the current sensor 108 may be accommodated in a single battery controller 103 (semiconductor package). Therefore, in comparison with the first embodiment, it is possible to reduce a mounting area and to reduce the number of parts.

Furthermore, the battery system 100 is connected through a power supply circuit 115 to the load 111, so that a stable voltage is supplied to the load 111. In addition, the battery system 100 can be connected through a charging circuit 116 and a plug 117 to a commercial power supply, and thus, if necessary, the battery module 105 can be charged.

The present invention described heretofore is summarized. The battery system 100 according to the present invention includes the battery module 105 including the unit cell 101 and the cell controller 102 performing control of the unit cell 101 and the battery controller 103 performing control of the battery module 105; the cell controller 102 includes the abnormality diagnosis unit 202 which diagnoses the presence or absence of abnormality of the unit cell 101, the state detection unit 203 which calculates any one or more of voltage, current, temperature, SOC, SOH, and allowable charge/discharge current of the unit cell 101, the power line communication unit 204 which performs wire communication, and the wireless communication unit 205 which performs wireless communication; the information diagnosed by the abnormality diagnosis unit 202 is output through the power line communication unit 204 to the battery controller 103; and the information calculated by the state detection unit 203 is output through the wireless communication unit 205 to the battery controller 103. By such a configuration, the transmission of the abnormality information requiring reliable transmission can be performed through the wire communication, the transmission of the information of the voltage, current, temperature, SOC, SOH, and allowable charge/discharge current of the unit cell requiring high-speed communication due to a large data amount can be performed through the wireless communication, so that it is possible to achieve high-speed control and to improve safety.

In addition, in the battery system 100 according to the present invention, the power line communication unit 204 outputs the information to the battery controller 103 by using the power line 104 connected to the unit cell 101. By such a configuration, a new communication line for communication of the abnormality information needs not to be provided. Therefore, the structure of the battery system can be simplified, so that the cost is reduced.

In addition, in the battery system 100 according to the present invention, the information diagnosed by the abnormality diagnosis unit 202 is further output to the wireless communication unit 205, and the wireless communication unit 205 outputs the diagnosed information to the battery controller 103. By such a configuration, even in the case where the abnormality such as disconnection occurs in the power line 104 and the power line communication is disable, it is possible to transmit the abnormality information through the wireless communication unit 205. For this reason, the safety or the reliability is improved.

In addition, the battery system 100 according to the present invention includes a switch (relay 106 or the like) which is connected in series to the battery module 105, and the battery controller 103 controls opening and closing of the switch on the basis of the information diagnosed by the abnormality diagnosis unit 202. By such a configuration, when the abnormality occurs in the battery module 105, the disconnection between the battery system 100 and the load 111 can be securely performed, so that the safety is improved.

In addition, in the battery system 100 according to the present invention, the switch (MOSFET 114 or semiconductor switch) is configured within the battery controller 103. According to such a configuration, it is possible to reduce a mounting area and to reduce the number of parts.

In addition, in the control method for the battery system 100 according to the present invention, the battery system includes the battery module 105 including the unit cell 101 and the cell controller 102 performing control of the unit cell 101 and the battery controller 103 performing control of the battery module 105; the cell controller 102 performs diagnosis of the abnormality of the unit cell 101 in the battery module 105 and calculation of the information of any one or more of voltage, current, temperature, SOC, SOH, and allowable charge/discharge current; the abnormality information is output to the battery controller 103 through the wire communication; and the information of any one or more of voltage, current, temperature, SOC, SOH, and allowable charge/discharge current is output to the battery controller 103 through the wireless communication. By such a configuration, the transmission of the abnormality information requiring reliable transmission can be performed through the wire communication, the transmission of the information of the voltage, current, temperature, SOC, SOH, and allowable charge/discharge current of the unit cell requiring high-speed communication due to a large data amount can be performed through the wireless communication, so that it is possible to achieve high-speed control and to improve safety.

In addition, in the control method for the battery system 100 according to the present invention, the abnormality information of the battery module 105 is further output to the battery controller 103 through the wireless communication. By such a configuration, even in the case where the abnormality such as disconnection occurs in the power line 104 and the power line communication is disable, it is possible to transmit the abnormality information through the wireless communication unit 205. For this reason, the safety or the reliability is improved.

In addition, in the control method for the battery system 100 according to the present invention, the switch (relay 106 or the like) is configured to prioritize open/close instruction based the abnormality information from the cell controller 102 in comparison with open/close instruction from the battery controller 103. According to such a configuration, even in the case where the abnormality occurs in the unit cell 101 in the battery module 105, the battery system 100 and the load 111 can be immediately disconnected. For this reason, the safety or the reliability is improved.

Heretofore, while the embodiments of the present invention are described, the present invention is not limited to the above-described embodiment, but various changes in design are available without departing from the spirit of the present invention disclosed in the claims. For example, the above-described embodiment is described in detail for the better understanding of the present invention, but the present invention is not limited to necessarily include all the configurations described above. In addition, some configurations of one embodiment may be replaced with some configurations of another embodiment, and some configurations of one embodiment may be added with some configurations of another embodiment. Furthermore, some portions of configurations of each embodiment may be added, removed, replaced with other configurations.

REFERENCE SIGNS LIST 100 battery system
101 unit cell
102 cell controller
103 battery controller
104 power line
105 battery module
106 relay
107 breaker
108 current sensor
110 inverter
111 load
112 upper-level controller
113 voltage detection line
114 semiconductor switch
115 power supply circuit
116 charging circuit
117 plug
201 measurement unit
202 abnormality diagnosis unit
203 state detection unit
204 power line communication
205 wireless communication
206 relay module
401 battery control unit
402 wireless communication
403 power line communication
502 control unit
503 power line communication
601 CPU
602 voltage sensor
603 leakage sensor

The invention claimed is:

1. A battery system comprising:
a battery module including a unit cell and a cell controller performing control of the unit cell; and
a battery controller performing control of the battery module,
wherein the cell controller includes an abnormality diagnosis unit which diagnoses the presence or absence of abnormality of the unit cell, a state detection unit which calculates any one or more of voltage, current, temperature, SOC, SOH, and allowable charge/discharge current of the unit cell, a power line communication unit which performs wire communication, and a wireless communication unit which performs wireless communication, wherein the abnormality diagnosis unit diagnoses an abnormality based upon whether or not the voltage or temperature of the unit cell is a value indicating an over-charge, over-discharge, or over-current, and
wherein information diagnosed by the abnormality diagnosis unit is output through the power line communication unit, which converts the information received from the abnormality diagnosis unit to an alternating current (AC) signal, and outputs the AC signal to the battery controller, and information calculated by the state detection unit is output through the wireless communication unit to the battery controller.

2. The battery system according to claim 1, wherein the power line communication unit outputs information to the battery controller by using a power line connected to the unit cell.

3. The battery system according to claim 2, wherein the information diagnosed by the abnormality diagnosis unit is further output to the wireless communication unit, and the wireless communication unit outputs the diagnosed information to the battery controller.

4. The battery system according to claim 1, further comprising a switch which is connected in series to the battery module,
wherein the battery controller controls opening and closing of the switch on the basis of the information diagnosed by the abnormality diagnosis unit.

5. The battery system according to claim 4, wherein the switch is configured in the battery controller.

6. A control method for a battery system, the battery system including:
a battery module including a unit cell and a cell controller performing control of the unit cell; and
a battery controller performing control of the battery module,
wherein the cell controller performs abnormality diagnosis of the unit cell in the battery module and calculation of information of any one or more of voltage, current, temperature, SOC, SOH, and allowable charge/discharge current, wherein the diagnoses of an abnormality is based upon whether or not the voltage or temperature of the unit cell is a value indicating an over-charge, over-discharge, or over-current, wherein the abnormality information is converted to an alternating current (AC) signal, and the AC signal is output to the battery controller through wire communication, and wherein the information of any one or more of voltage, current, temperature, SOC, SOH, and allowable charge/discharge current is output to the battery controller through wireless communication.

7. The control method for a battery system according to claim 6, wherein the abnormality information of the battery module is further output to the battery controller through the wireless communication.

8. The control method for a battery system according to claim 6, wherein the battery system further includes a switch which is connected in series to the battery module, and wherein opening and closing of the switch are controlled by the battery controller.

9. The control method for a battery system according to claim 8, wherein the switch is configured to prioritize open/close instruction based on the abnormality information from the cell controller in comparison with open/close instruction from the battery controller.

* * * * *